(12) United States Patent
Cuevas

(10) Patent No.: US 7,511,925 B1
(45) Date of Patent: Mar. 31, 2009

(54) WINDAGE INSENSITIVE DISK DRIVE SUSPENSION

(75) Inventor: Rafael Cuevas, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 453 days.

(21) Appl. No.: 11/303,126

(22) Filed: Dec. 15, 2005

Related U.S. Application Data

(60) Provisional application No. 60/677,225, filed on May 2, 2005.

(51) Int. Cl.
G11B 21/08 (2006.01)
(52) U.S. Cl. ...................................................... 360/266
(58) Field of Classification Search .............. 360/244.2, 360/244.3, 24.8, 244.9, 265.9, 266
See application file for complete search history.

(56) References Cited

U.S. PATENT DOCUMENTS

| | | | |
|---|---|---|---|
| 5,140,480 A * | 8/1992 | DeMoss | ..................... 360/224 |
| 5,731,931 A | 3/1998 | Goss | |
| 5,734,526 A | 3/1998 | Symons | |
| 5,894,655 A | 4/1999 | Symons | |
| 5,966,269 A | 10/1999 | Marek et al. | |
| 6,014,289 A | 1/2000 | Goss | |
| 6,751,068 B1 * | 6/2004 | Kant et al. | ................... 360/266 |
| 6,801,405 B2 * | 10/2004 | Boutaghou et al. | ....... 360/265.9 |
| 2002/0085313 A1 * | 7/2002 | Boutaghou et al. | ........ 360/244.9 |
| 2002/0181155 A1 * | 12/2002 | Takagi et al. | ............. 360/244.3 |
| 2003/0002220 A1 * | 1/2003 | Nojima | ..................... 360/244.9 |
| 2003/0161073 A1 * | 8/2003 | Horie et al. | .............. 360/244.2 |

* cited by examiner

Primary Examiner—Tianjie Chen
(74) Attorney, Agent, or Firm—Intellectual Property Law Office of Joel D. Voelzke

(57) ABSTRACT

Windage is the sum of multifarious airflows induced and endured inside a disk drive. The invention provides a disk drive suspension and method for use in windage conditions within a disk drive. The suspension has a base portion carrying a hinge portion that carries a beam portion having oppositely facing first and second surfaces. The second surface supports a flexible circuit. Where the beam portion first surface has surface features inducing tracking error-causing perturbations of the beam portion from windage contact with the features, an airfoil profile-defining deflector is provided in operative association with the beam portion to block windage contact with those features and eliminate track misregistration error caused by interaction of the windage and the features.

21 Claims, 11 Drawing Sheets

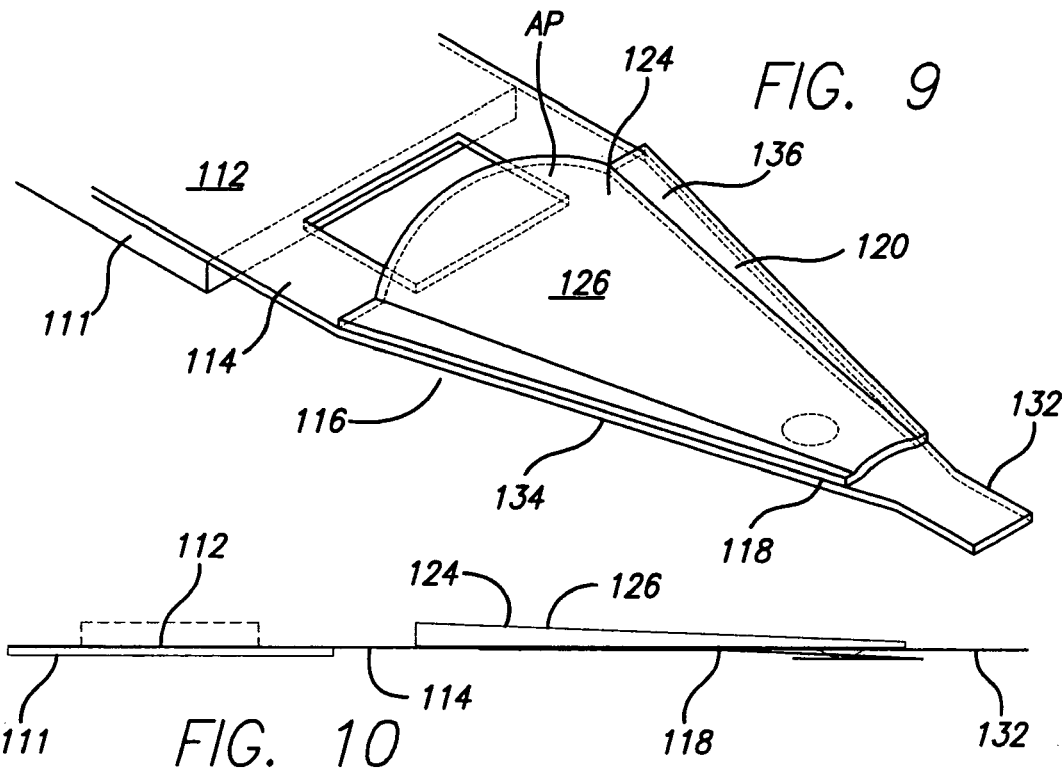
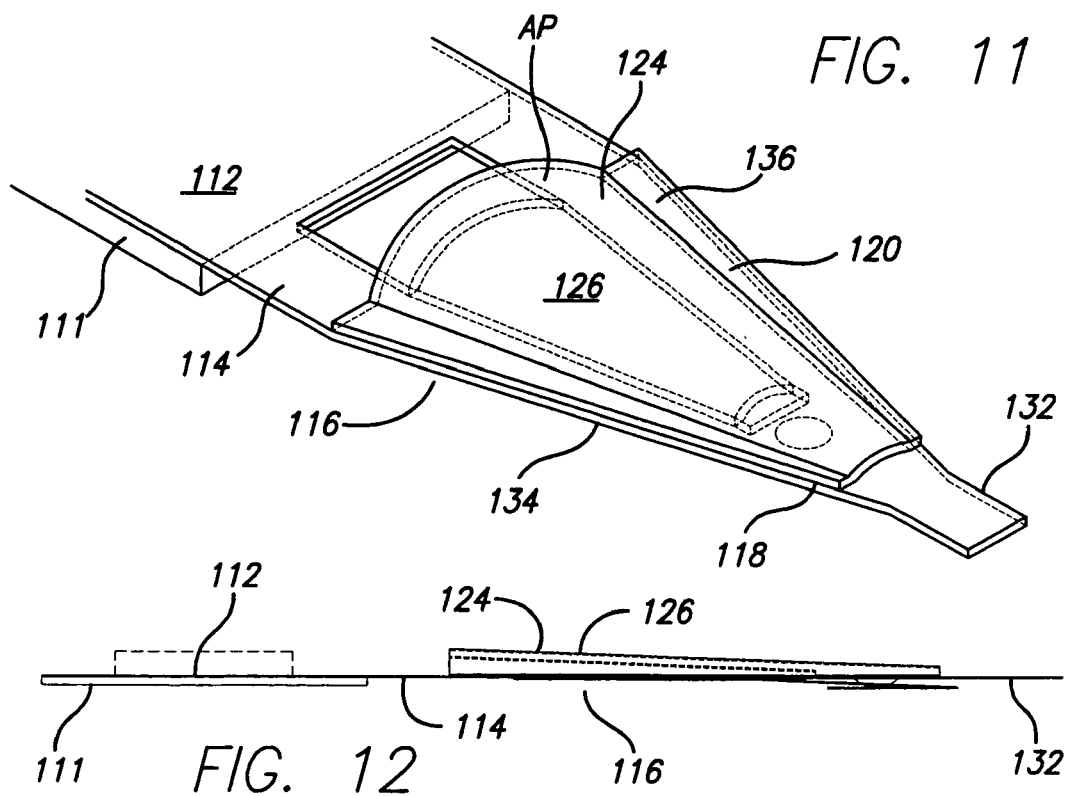

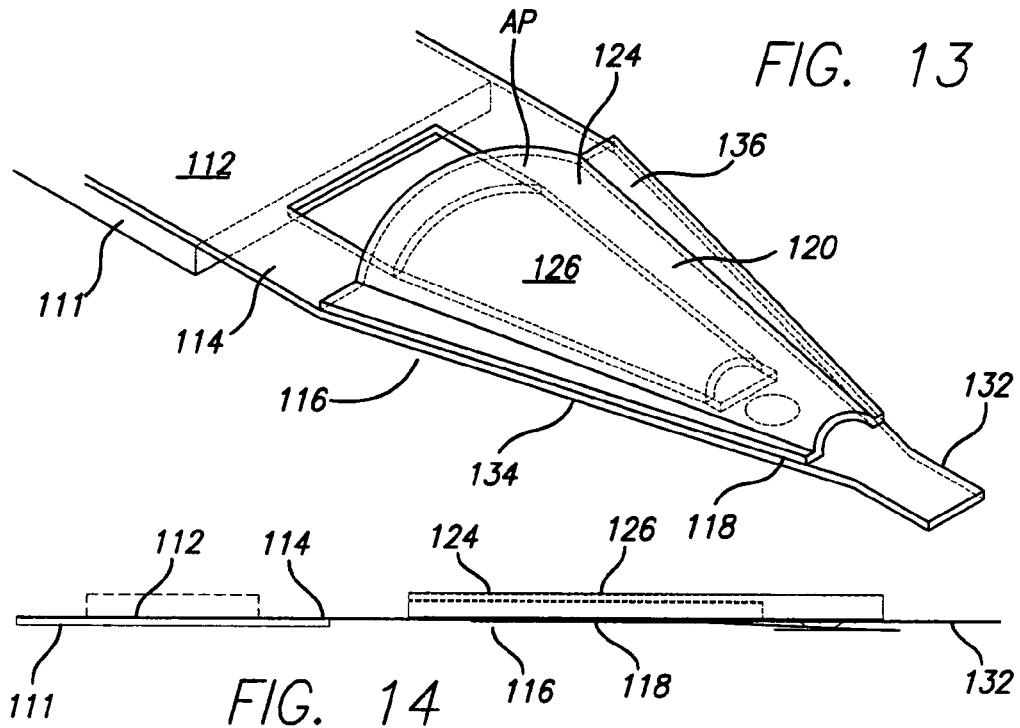
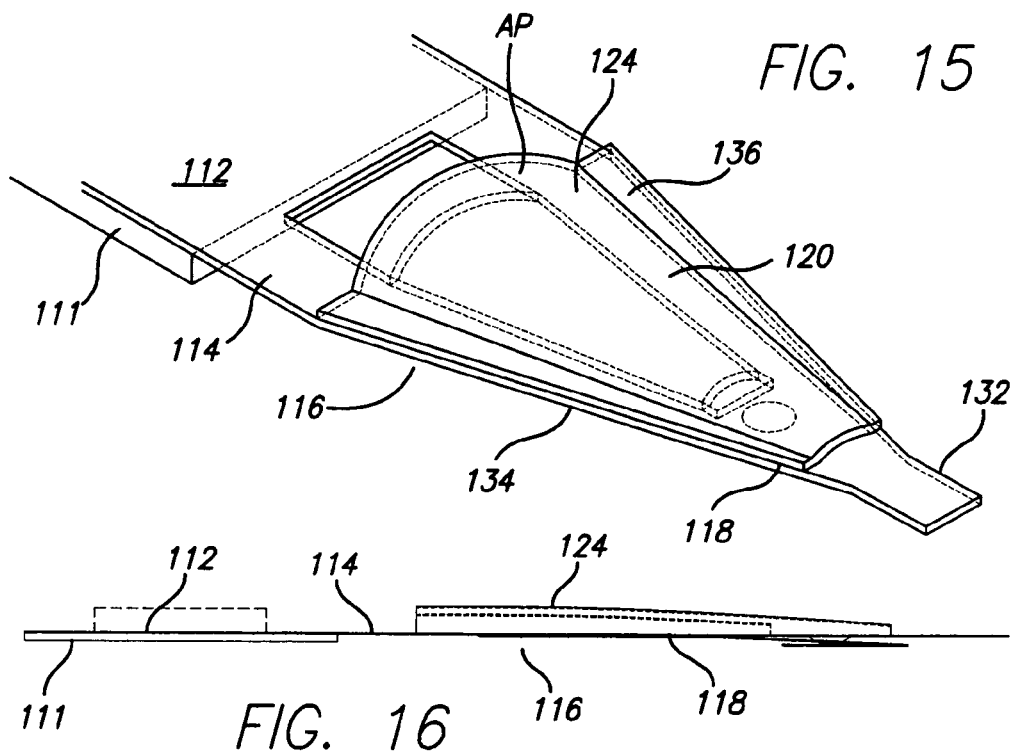

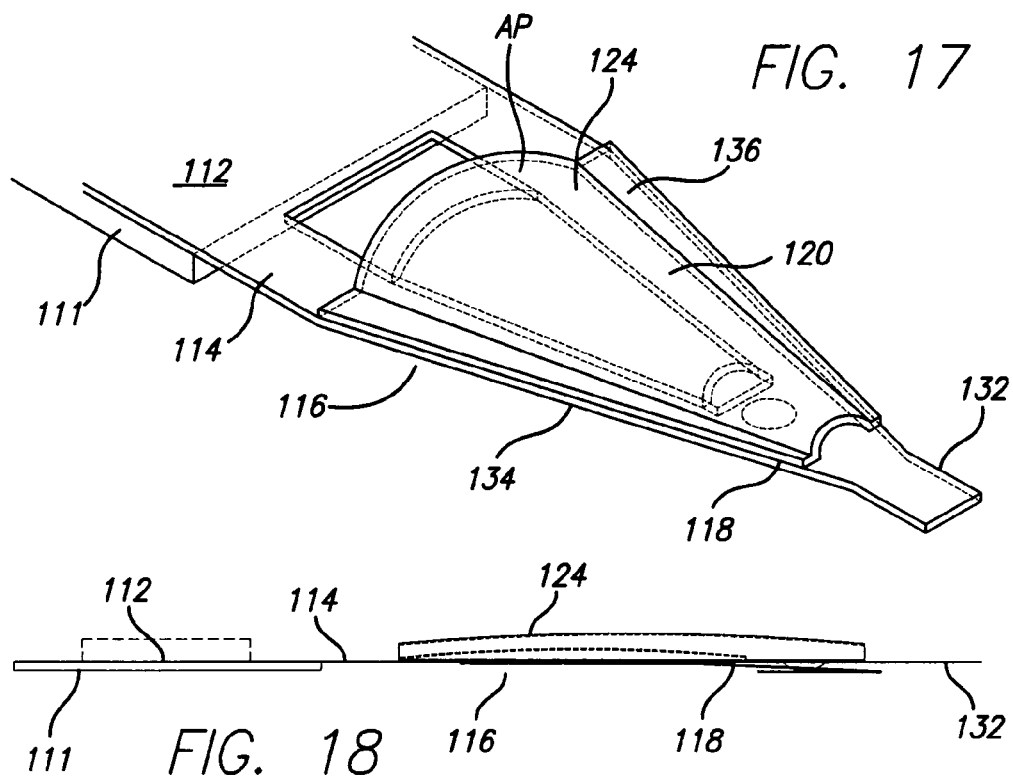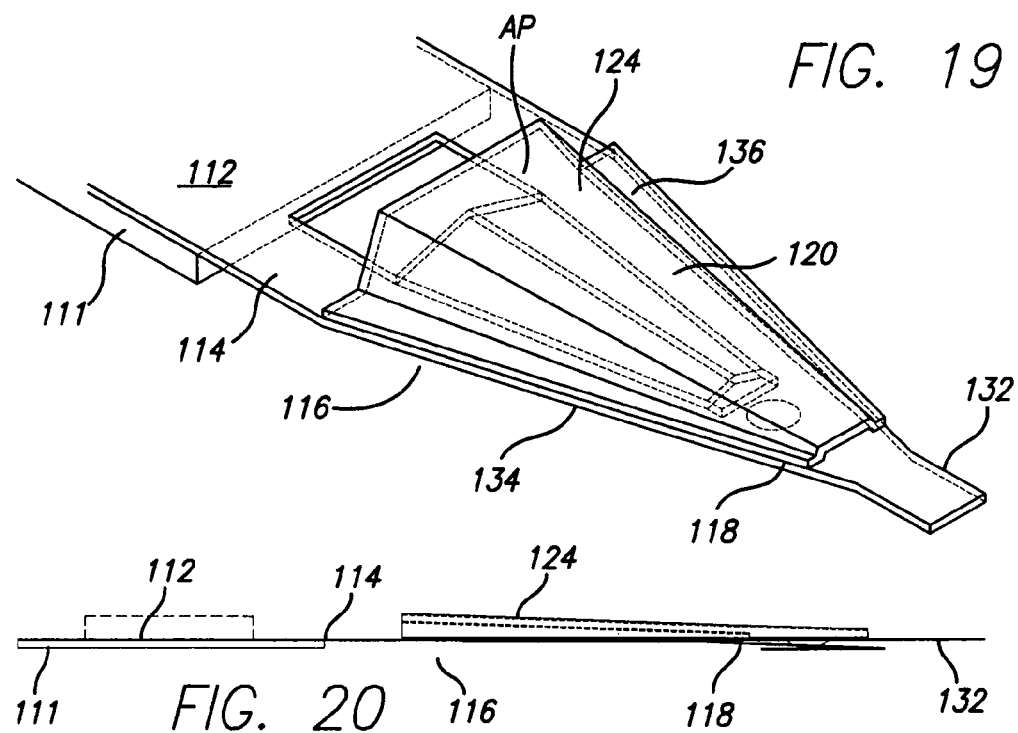

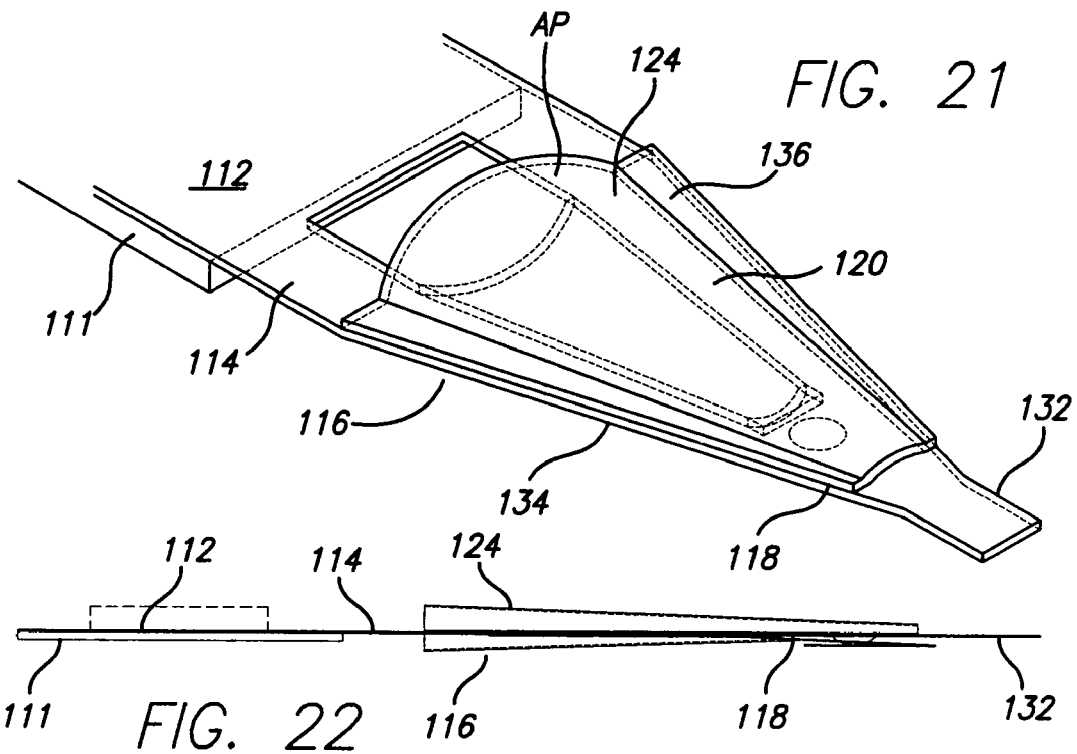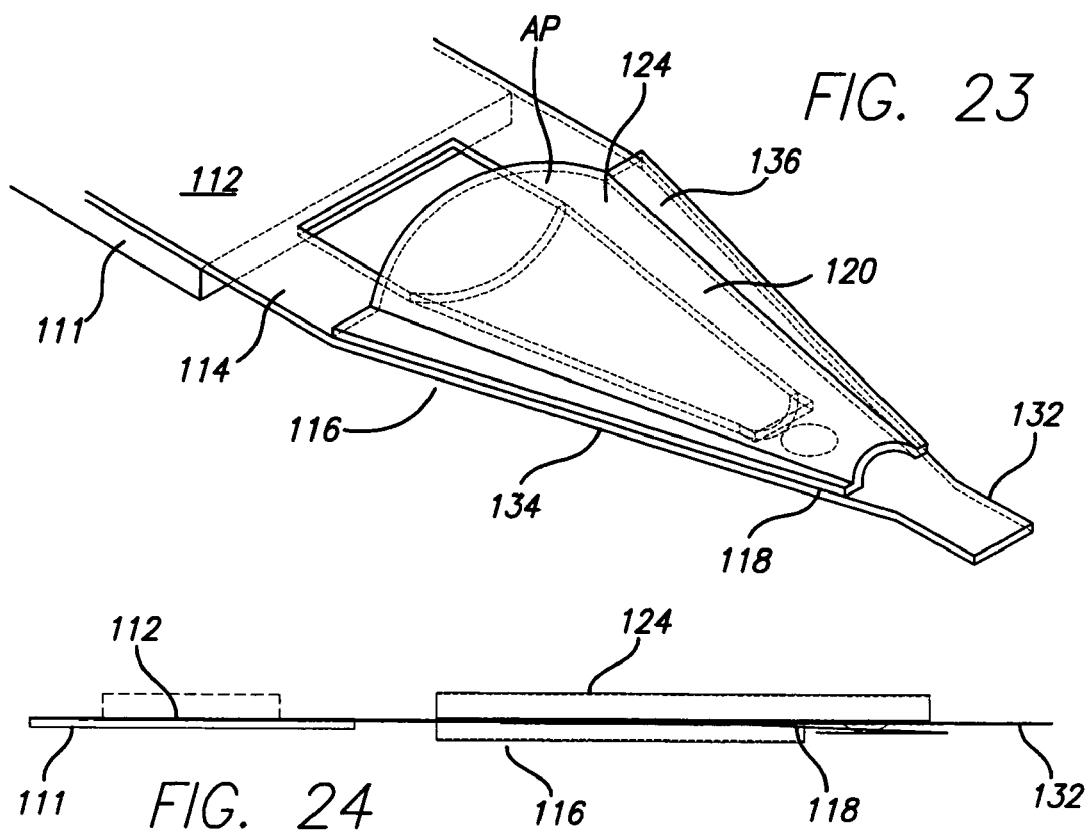

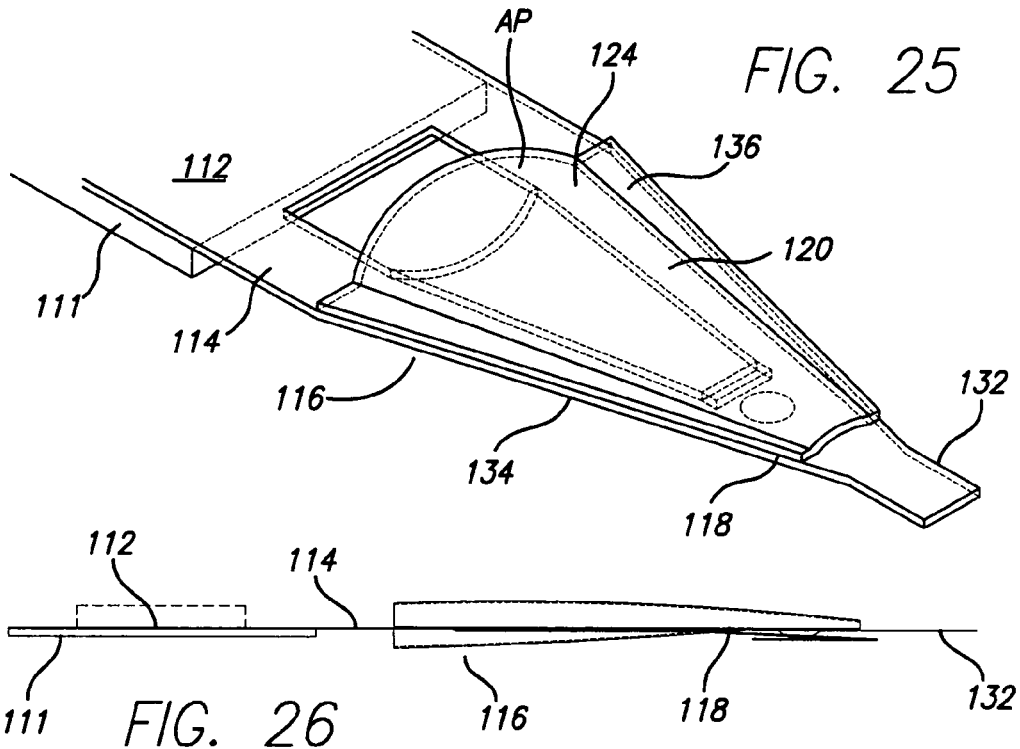
FIG. 25
FIG. 26
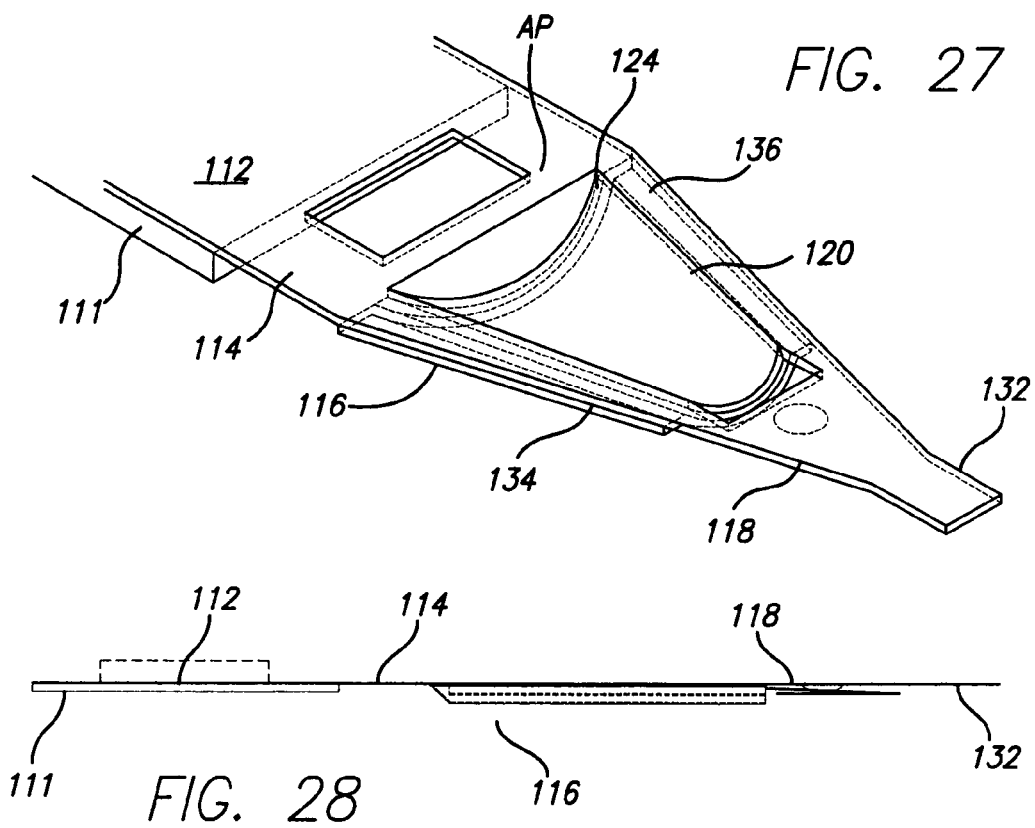
FIG. 27
FIG. 28

WINDAGE INSENSITIVE DISK DRIVE SUSPENSION

CROSS-REFERENCE TO RELATED APPLICATIONS

This application claims the benefit of U.S. Provisional Application Ser. No. 60/677,225, filed May 2, 2005.

BACKGROUND OF THE INVENTION

1. Field of the Invention

This invention relates to disk drive suspensions insensitive to windage encountered in a disk drive that produces track misregistration (TMR) errors. More particularly, the invention relates to disk drive suspensions provided with curvilinear covers over windage sensitive features to provide suspensions having reduced track misregistration errors caused by windage within the disk drive. Windage is the combination of airflow factors acting on a suspension as hereinafter explained. The invention suspension and method block windage airflows from contact with suspension beam surface features that, in windage contact, induce tracking error-causing perturbations in the suspension. The invention uses an airfoil profile-defining deflector that overlies the beam surface features and deflects windage airflows past these features smoothly.

2. Description of the Related Art

One of the critical dimensions of a disk drive is its track density, which is a measure of its ability to correctly write and then read back a very narrow cylinder of data ("track") in close proximity to other similar, parallel tracks. Current disk drives have a track density of 100 thousand tracks per inch or more, which means that the track-to-track centerline distance ("track pitch") is 10 millionths of an inch or less. The suspension must hold the recording head in correct position over the track well within this distance or the head will erroneously read data from or write data onto another track, resulting in incorrect or lost data. The measure of the disk drive's inability to hold position correctly is known as "off track error", or track misregistration. The track density figure is on an increasing trend over time with a corresponding decrease in track pitch in order to obtain increased disk storage capacity in each successive new disk drive generation.

Improving suspension natural resonance frequencies and amplitudes has the effect of removing the influence of the peaks of the frequency response function that is a major contributor to off track error. The natural frequency responses are excited or driven by vibrations inherent in the disk drive, including motor vibration for the motor that spins the disk, bearings in the motor spindle and actuator, and the lateral acceleration of the spinning disks and accompanying air flows (or windage) over, under, across, head-on and otherwise into and around the suspension. Other than windage-related sources these contributors to error have been addressed with some success.

The graph of the relationship between the amplitude response of the suspension and the excitation frequency is a transfer function referred to as FRF or Frequency Response Function. A transfer function is the output (response) divided by the input (excitation). The FRF is normally determined by shaking or vibrating the base of the suspension and measuring the amplitude of the resulting movement of the slider at the other end. This will reveal the peak amplitudes and their corresponding frequencies. In actual use in the disk drive, however, as opposed to the test stand, the excitation is provided by the actuator (during seek, which is lateral movement to move from track to track) and by the airflows (collectively generalized as windage) in the disk drive. The total off track error is characterized by the area under the windage function.

BRIEF SUMMARY OF THE INVENTION

The efforts described above to move the frequencies of the amplitude peaks, or eliminate or reduce their amplitudes helps to reduce the total error. But heretofore left unaddressed has been the portion of the error from non-resonant response of the suspension to windage, represented by the area under the windage function curve between the peaks. Thus even with removal of the peaks there is a substantial area of the curve that represents a source of off track error that has not been reduced.

The present invention addresses this source of error by reducing the influence of non-resonant response by blocking contact of the airflows with suspension beam portion features that produce error from their interaction with windage. The invention further preferably uses a curvilinear, not straight sided, monocoque configuration that allows a rigid, low mass structure which, when combined with other features of the invention, produces suspensions with responses (natural frequencies of oscillation) that are high enough and amplitudes that are low enough that they are usable in high performance disk drives.

It is an object of the invention therefore to provide an improved disk drive suspension and disk drive utilizing such a suspension. It is a further object to provide a suspension having a contour-irregularity-free deflector profile of an airfoil type that presents a smooth surface to deflect without turbulence the windage encountered by the suspension beam portion. It is a further object to enshroud between opposed surfaces of the suspension, by they in plano-convex, convex-convex, concave-convex, longitudinal and/or transverse, convergently tapered or not, relation, any beam surface features tending to cause non-resonant response of the suspension under windage conditions. It is a further object to provide a rigid beam portion free of edge rails. Another object is to define on a suspension beam portion an airfoil that is curvilinear so as to define with the beam portion a volume having a curved major boundary and including a beam portion surface. It is a further object to provide a two-member monocoque suspension configuration with the beam portion forming one member and the airfoil deflector superimposed on the beam portion the other member.

These and other objects of the invention to become apparent hereinafter are realized in a disk drive suspension for use in windage conditions, the suspension comprising a base portion, a hinge portion supported by the base portion, and a beam portion supported by the hinge portion and having a surface, the beam portion surface having surface features inducing tracking error-causing perturbations of the beam portion from windage contact with the features, and an airfoil profile-defining deflector in operative association with the beam portion in windage-surface feature contact blocking relation.

In this and like embodiments, typically, the beam portion has a longitudinal axis and extends along the axis in a flat plane to a distal terminus and is tapered, typically both continuously and progressively inward toward the terminus within the plane, the deflector extends in a curved plane about a deflector longitudinal axis parallel with the beam portion longitudinal axis, the deflector has an airfoil profile that is tapered, typically continuously and progressively inward along the deflector axis within the curved plane, or the deflector has a constant airfoil profile for the majority of its extent along the deflector longitudinal axis within the curved plane, the beam portion surface extends in a flat plane and is progressively tapered in width within the plane, the deflector is attached at the beam portion surface and generally congruent with the beam portion surface where attached, the deflector transverse profile is arcuate, or the deflector longitudinal profile is a arcuate or a conical section.

Airfoil and airfoil profile herein refer to a shape characterized in that air streams pass over smoothly without substantial backflows, turbulence, and/or eddies likely to cause vibrational or other perturbations of a suspension having such a shape that contribute to TMR.

Broadly speaking, in all embodiments of the invention the deflector can be generalized to comprise an airfoil profile insensitive to windage in the sense that while windage will exist about the profile it has no substantial perturbation effect. Windage insensitivity can be established in a suspension having an airfoil profile that is plano-convex transversely, plano-convex longitudinally, convex-convex transversely, convex-convex longitudinally, convex-concave transversely, and convex-concave longitudinally singly or in combination. Further, the airfoil profile can be of constant radius transversely throughout its length or transversely tapered along its length through a series of varying radii.

In another embodiment, then, the invention provides a disk drive suspension for use in windage conditions, the suspension comprising a base portion, a hinge portion supported by the base portion, and a beam portion comprising longitudinally extended and opposed first and second members arranged in plano-convex relation in the beam portion transverse cross-section to define an airfoil profile insensitive to windage.

In this and like embodiments, typically, the beam portion is free of edge rails, the beam portion first and second members are also arranged in plano-convex relation in the beam portion longitudinal cross section, or the beam portion first and second members are arranged in concave-convex relation in beam portion longitudinal cross section, or the beam portion first and second members are arranged in convex-convex relation in beam portion longitudinal cross-section.

In a further embodiment, the invention provides a disk drive suspension for use in windage conditions, the suspension comprising a base portion, a hinge portion supported by the base portion, and a beam portion of first and second members arranged in plano-convex relation in longitudinal cross-section to define an airfoil profile insensitive to windage. As in previous and like embodiments, the beam portion is free of edge rails. In this embodiment, the beam portion first and second members are also arranged in plano-convex, concave-convex, or convex-convex relation in the beam portion transverse cross section.

In a still further embodiment, a disk drive suspension is provided for use in windage conditions, the suspension comprising a base portion, a hinge portion supported by the base portion, and a beam portion that can be free of edge rails and comprises longitudinally extended and opposed first and second members arranged in concave-convex relation in the beam portion transverse cross-section to define an airfoil profile insensitive to windage. In the embodiment, the beam portion first and second members can also be arranged in concave-convex relation in the beam portion longitudinal cross section, or in plano-convex or convex-convex relation in the beam portion longitudinal cross section.

In yet another embodiment the invention provides a disk drive suspension comprising a base portion, a hinge portion supported by the base portion, and a beam portion of first and second members arranged in concave-convex relation in longitudinal cross-section to define an airfoil profile insensitive to windage wherein the beam portion first and second members are also arranged in concave-convex relation in the beam portion transverse cross section or are plano-convex or convex-convex in transverse cross section.

In a further embodiment, there is provided a disk drive suspension comprising a base portion, a hinge portion supported by the base portion, and a beam portion of first and second members arranged in convex-convex relation in transverse cross-section to define an airfoil profile insensitive to windage and in which the beam portion first and second members are also arranged in convex-convex relation in the beam portion longitudinal cross section, or are arranged in plano-convex relation in the beam portion longitudinal cross section, or are arranged in concave-convex relation in the beam portion longitudinal cross section.

In another embodiment, the invention provides a disk drive suspension comprising a base portion, a hinge portion supported by the base portion, and a beam portion of first and second members arranged in convex-convex relation in longitudinal cross-section to define an airfoil profile insensitive to windage, and in which the beam portion first and second members are also arranged in convex-convex relation in the beam portion transverse cross section, or in a plano-convex or convex-convex relation in the beam transverse cross section.

In a highly particular embodiment, the invention provides a disk drive suspension for use in windage conditions, the suspension comprising a base portion, a hinge portion supported by the base portion, and a beam portion supported by the hinge portion and having oppositely facing first and second surfaces, a circuit supported by the beam portion second surface, the beam portion first surface having surface features inducing tracking error-causing perturbations of the beam portion from windage contact with the features, and an airfoil profile-defining deflector in operative association with the beam portion in windage-surface feature contact blocking relation.

In this and like embodiments, typically, the beam portion first surface has a transverse extent terminating in right and left edge margins in a common plane and a beam first surface central region therebetween, and the deflector has left and right edge margins opposed to the first surface portion left and right edge margins, the deflector and the beam central region cooperatively defining a volume extending in an x-axis longitudinally along the first surface and extending in a y-axis transversely along the first surface and in the z-axis a curved boundary between the first surface left edge and the right edge in airfoil defining relation opposite the beam portion transverse extent, whereby windage encountered from the left or right by the suspension is deflected smoothly past the beam portion by the deflector airfoil.

Further, in this embodiment, typically, the beam portion has a distal surface region at its distal terminus, and the deflector tapers toward the distal surface region, whereby windage encountered from the suspension left or right or the suspension terminus is deflected smoothly past the beam portion distal terminus by the deflector tapered airfoil, the beam portion first surface has a distal surface region at its distal terminus, and the deflector comprises a conical section tapered inward so that its left and right edge margins converge and taper downward toward the first surface distal surface region, whereby windage encountered by the beam portion is deflected smoothly past the beam portion distal terminus by the deflector tapered airfoil, the beam portion is free of edge rails, and the beam portion second surface is recessed to at least partially receive the circuit in windage effect reducing relation.

In the invention there is further provided a method of manufacturing a disk drive suspension having a beam portion and to be operated under windage conditions, including forming an airfoil-profile deflector sized to fit the beam portion, and incorporating the beam portion into a suspension with the deflector operatively associated with the beam portion in windage insensitive relation, and including, typically also relatively shaping the beam portion and the deflector to have a plano-convex, convex-convex and/or concave-convex relation in their associated condition.

The invention further provides a method of flying a disk drive suspension under windage conditions producing suspension perturbations upon windage contact with surface features of the beam portion of the suspension, including flying the suspension within the windage, and blocking contact of windage with the surface features with an airfoil shrouding the features, including, preferably defining the airfoil with a deflector operatively associated with the beam portion and shaped and arranged to smoothly deflect the windage past the beam portion surface features.

BRIEF DESCRIPTION OF THE SEVERAL VIEWS OF THE DRAWINGS

The invention will be further described in conjunction with the attached drawings in which:

FIG. 9 is an oblique view of the suspension of FIG. 1 having both a transverse and longitudinal plano-convex configuration;

FIG. 10 is a side elevation view thereof;

FIG. 11 is a view of an alternate embodiment having a transverse convex-convex configuration of suspension beam portion members;

FIG. 12 is a side elevation view thereof;

FIG. 13 is a view of a further alternate embodiment;

FIG. 14 is a side elevation view thereof;

FIG. 15 is a view of an alternate embodiment having a longitudinal convex-convex configuration of suspension beam portion members;

FIG. 16 is a side elevation view thereof;

FIG. 17 is a view of an alternate embodiment;

FIG. 18 is a side elevation view thereof;

FIG. 19 is an oblique view of a suspension having both a transverse and longitudinal convex-convex configuration;

FIG. 20 is a side elevation view thereof;

FIG. 21 is a view of an alternate embodiment having a transverse convex-concave configuration of suspension beam portion members;

FIG. 22 is a side elevation view thereof;

FIG. 23 is a view of a further alternate embodiment;

FIG. 24 is a side elevation view thereof;

FIG. 25 is a view of an alternate embodiment having a longitudinal convex-concave configuration of suspension beam portion members;

FIG. 26 is a side elevation view thereof;

FIG. 27 is a view of an alternate embodiment;

FIG. 28 is a side elevation view thereof;

DETAILED DESCRIPTION OF THE INVENTION

Figure 1:
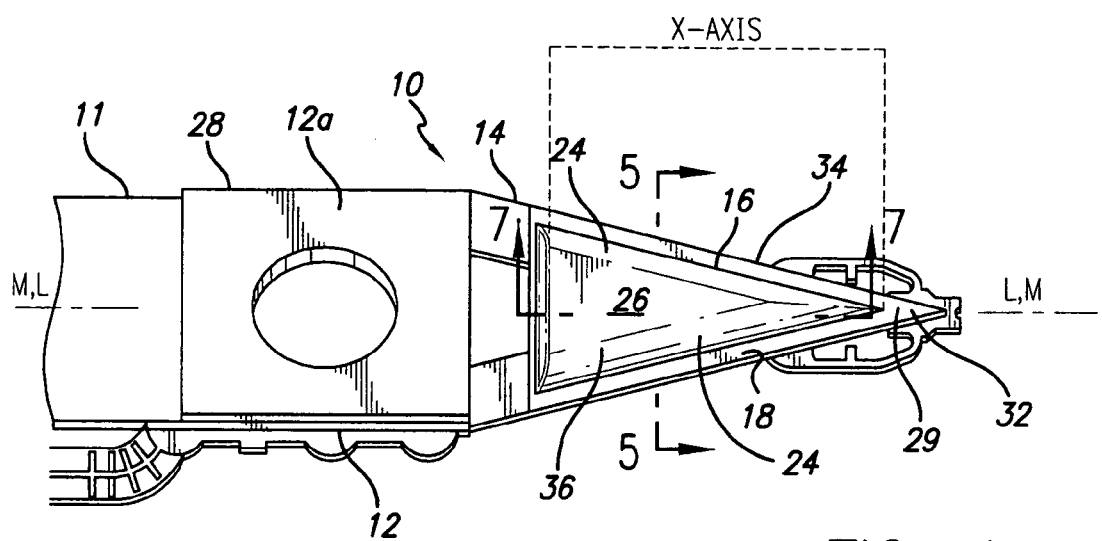
FIG. 1 is a top plan view of the invention suspension in plano-convex configuration of suspension beam portion members.
Figure 2:
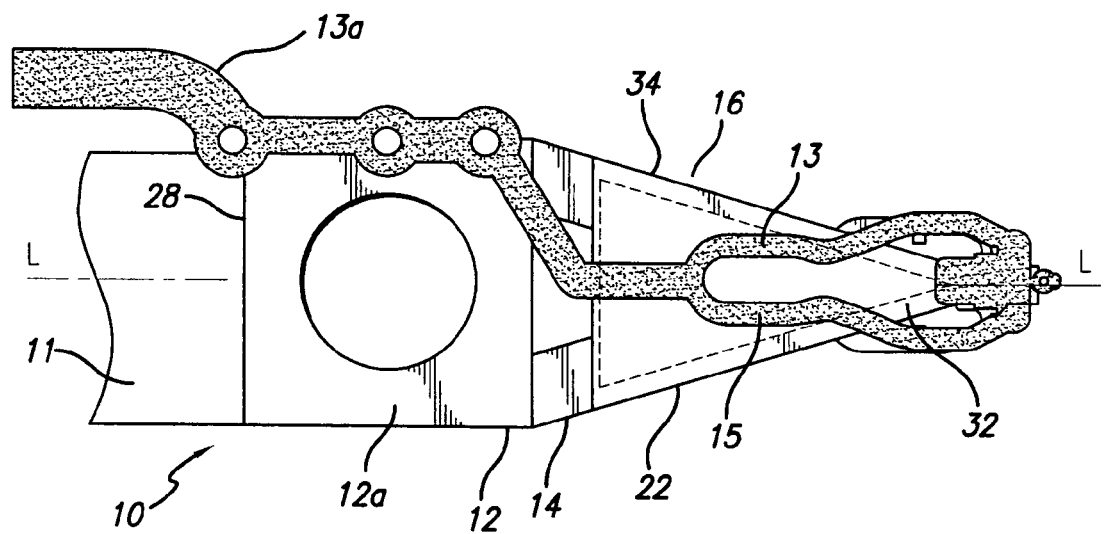
FIG. 2 is a bottom plan view thereof.

Disk drive suspensions comprise one or more layers of spring materials such as stainless steel extended horizontally from the actuator and mount plate at the base or proximate end to the gimbal region at the distal end where the slider is mounted. Surface features such as tooling and guide holes for manufacturing convenience, holes for weight reduction, material folds and thickness variations for rigidifying the beam, and weld points are located on the typical suspension in order to meet design criteria for stiffness, mass and dynamics. The presence of these and other protuberant or recessed surface features creates opportunities for windage contacts during suspension flying and these contacts cause windage disturbances and non-resonant frequency vibration modes in the suspension, individually and collectively referred to herein as perturbations of the suspension that lead to TMR, an unstable system and possible loss or miswriting of data.

This invention seeks to reduce or eliminate windage contact with suspension surface features while retaining the utility of these features, by enshrouding the features (save for necessarily continuingly accessible features such as tooling holes, for example) on the suspension beam portion with a cover having a curved major boundary that is operatively associated with the beam portion. Proximate of the beam portion the suspension is generally conventional using either a mount plate for actuator connection to the suspension base, or a base and mount combination defined by the suspension for attachment to an actuator. Distal of the beam portion, e.g. at the flexure and slider location and beyond, the suspension can also be conventional.

In general terms, the invention includes laminating or otherwise forming a second suspension member with a curved profile that is attached at a flat or curved surface of a load beam beam portion with laser welding or adhesive or otherwise to form a load beam having a plano-convex, convex-convex, convex-concave or concave-concave structure, i.e. a structure enclosing a volume having a curved major boundary over which windage passes smoothly. The source of the added layer (second member) of material to the already present (first member) beam portion can be the suspension hinge, the suspension flexure or other source of windage resistant (i.e. substantially non-deflective by windage) material. The interior volume of the curved cover can be empty of fill or filled or partially filled with a foam or other material for added stiffness if mass or other considerations do not preclude this, or for other purposes. The curved surface of the cover is airfoil shaped to increase the aerodynamics of the suspension. The elimination of rails (themselves a prime source of perturbation) as superfluous in view of the rigidity of the monocoque design of the invention, further contributes to smoothness of suspension flight, as the added stiffness from the curvilinear, e.g., convex or concave shape of the cover, itself reduces resonance mode sources of TMR.

Figure 3:
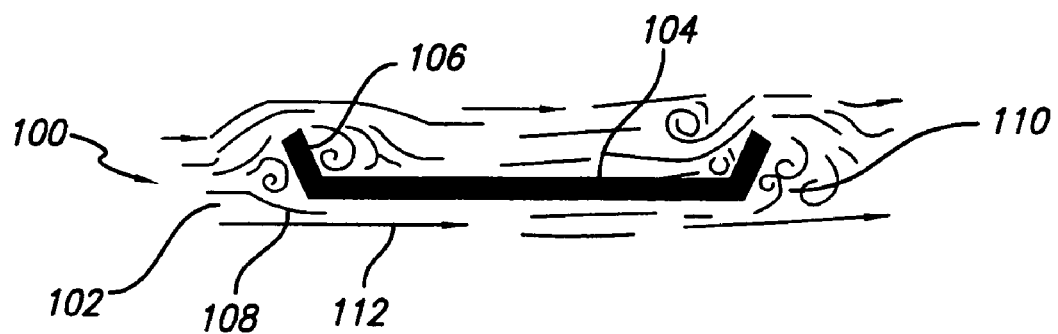
FIG. 3 is a PRIOR ART schematic view of turbulent air flows about a suspension caused by windage contact with suspension surface features.

With reference now to the drawings in detail, the PRIOR ART suspension 100 shown in FIG. 3 is illustrated with highly simplified air flows 102 across the suspension as indicative of windage air flows. In the actual case, air flows can be lateral to the suspension or head-on at the distal end or angled in-between, straight-on, spiraling or cyclonic, clockwise and counterclockwise or any or all of these at the same or different times. It will be noted that the FIG. 3 suspension beam portion 104 has edge rails 106 that tend oppose air flow 102 on the windward side 108 and induce vacuums on the leeward side 110 while the air flow under the suspension 112 is relatively smooth.

Figure 4:
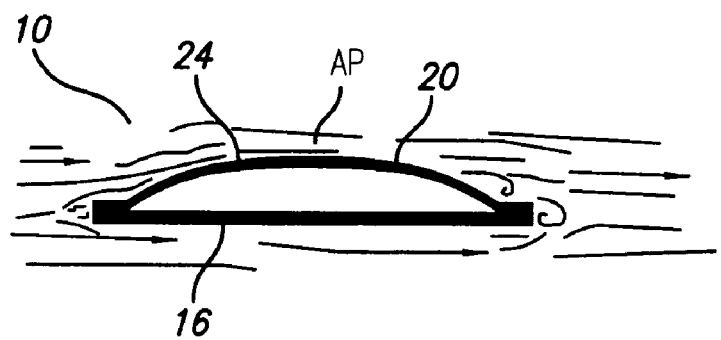
FIG. 4 is a schematic view like FIG. 3 of smooth air flows over a suspension realized in the invention.

In FIG. 4, the suspension 10 is modified to have a curved surface cover 20, over the beam portion 16 resulting in a smooth, aerodynamic flow of air across the suspension above and below. Turbulence is reduced and suspension perturbations attributed to windage minimized.

In FIGS. 1, 1A, 2, 4-9 and 19 the invention disk drive suspension 10 for use in windage conditions comprises a base portion 12 fixed to an actuator arm 11 by a mount plate 13 (omitted in FIG. 9), a hinge portion 14 supported by the base portion, and a beam portion 16 supported by the hinge portion and having a upper surface 18 and a lower surface 22. Beam portion surface 18 has surface features 18a, 18b, 18c including discontinuities such as holes and protuberances such as welds and rails that when present induce tracking error-causing perturbations of the beam portion from windage contact with the features. A cover 20 comprising an airfoil profile-defining deflector 24 is shown welded, adhered or otherwise in operative association with the beam portion 16 in windage-surface feature contact blocking relation. Deflector 24 has a curved outer surface 26 forming the airfoil having the profile AP and arranged to smoothly deflect oncoming windage from any direction. In general, in all embodiments of the invention the deflector 24 can be generalized to comprise an airfoil profile AP insensitive to windage.

Thus, typically, the beam portion 16 has a longitudinal axis L-L and extends along the axis in a flat plane F-F from its proximate end 28 to its distal terminus 32 and can be continuously progressively tapered inward toward the terminus within the plane F-F to provide a tapered airfoil profile AP. Deflector 24 extends in a curved plane C-C (FIG. 1A) generated about a deflector longitudinal axis M-M coincident or parallel with the beam portion longitudinal axis L-L when the deflector has a constant radius Rc (FIG. 8) and a constant radius airfoil profile AP for the majority of its extent along the deflector longitudinal axis within the curved plane, i.e. is not tapered toward the plane F-F along its axis. In either the tapered or the constant radius case the deflector transverse profile TP is arcuate. In the tapered case, the deflector longitudinal profile LP is a conical section, while in the constant radius case the longitudinal profile is cylindrical.

Figure 1A:
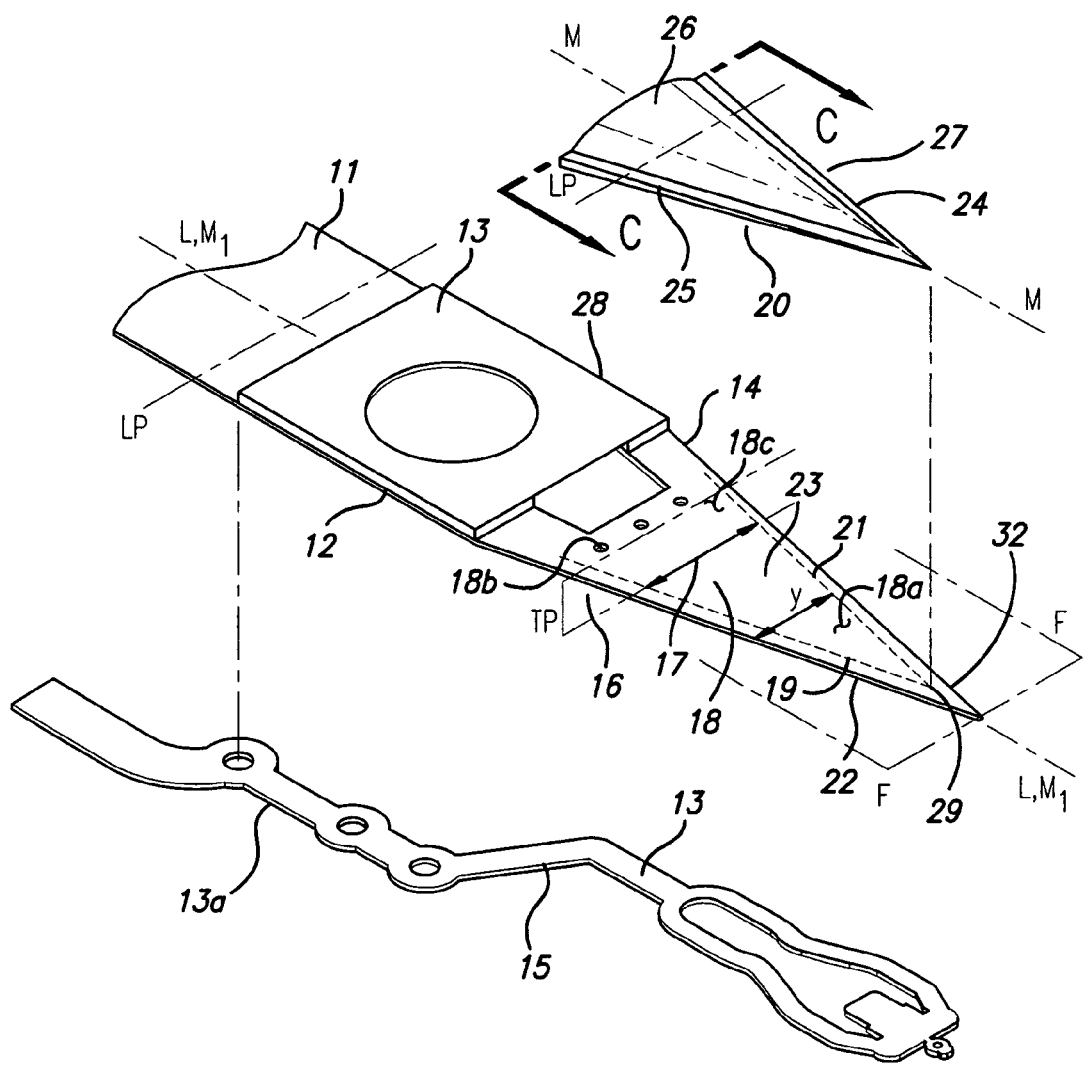
FIG. 1A is a fragmentary detail view of suspension beam portion surface features.
Figure 5:
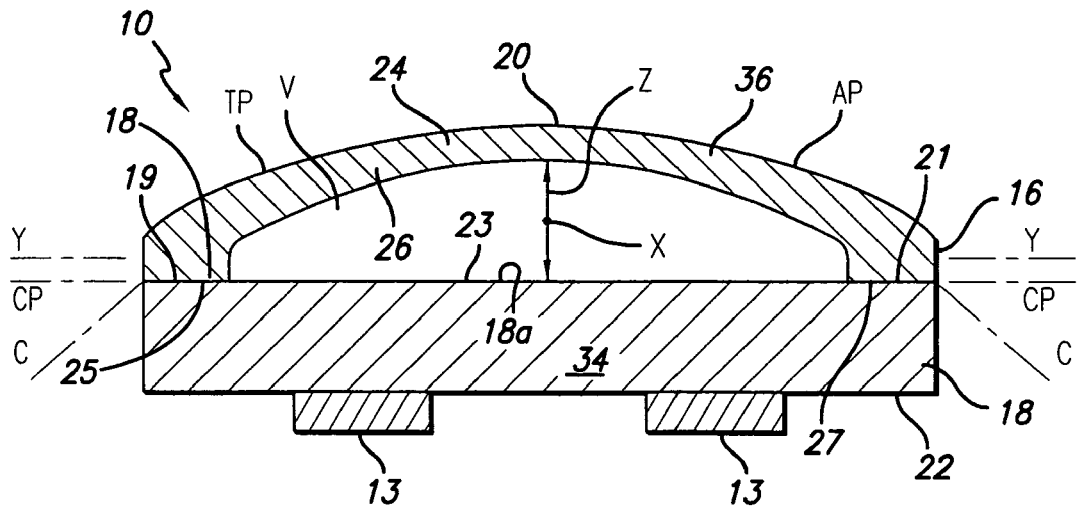
FIG. 5 is a transverse sectional view taken on line 5-5 in FIG. 1.

Deflector axis M-M about which the conical section longitudinal profile LP is generated is also coincident or parallel with beam portion longitudinal axis L-L when the deflector 24 tapers inward and downward distally as shown in FIGS. 1, 1A and 5 so that deflector airfoil profile AP is continuously progressively tapered inward along the deflector axis M-M within the curved plane C-C. Deflector 24 is attached to the tapered beam portion surface 18 by welding, adhesive or other means or can be a formed single part and is generally congruent therewith as shown where the beam portion and deflector meet.

Figure 6:
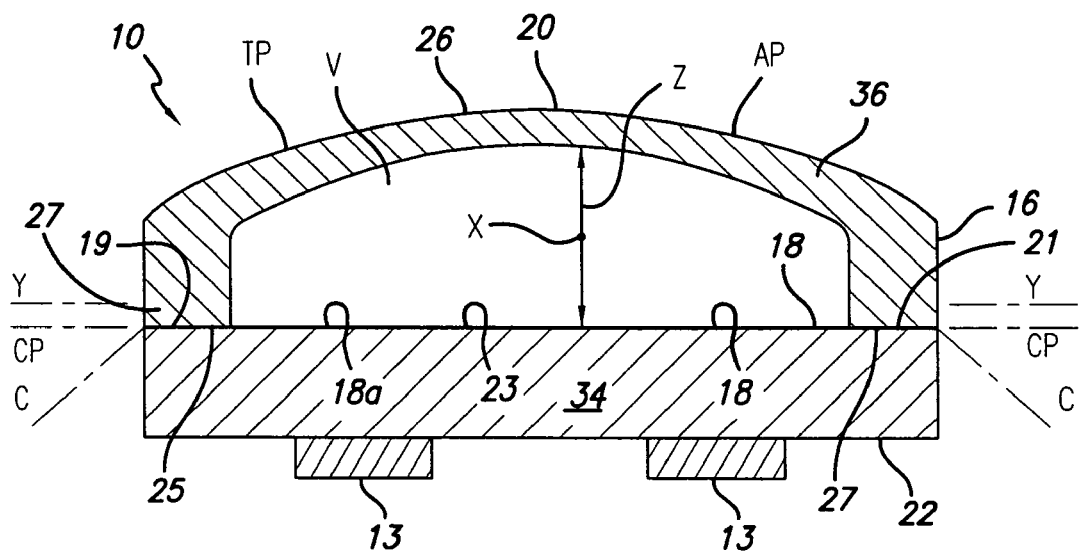
FIG. 6 is a view like FIG. 5 of an alternate embodiment.
Figure 7:
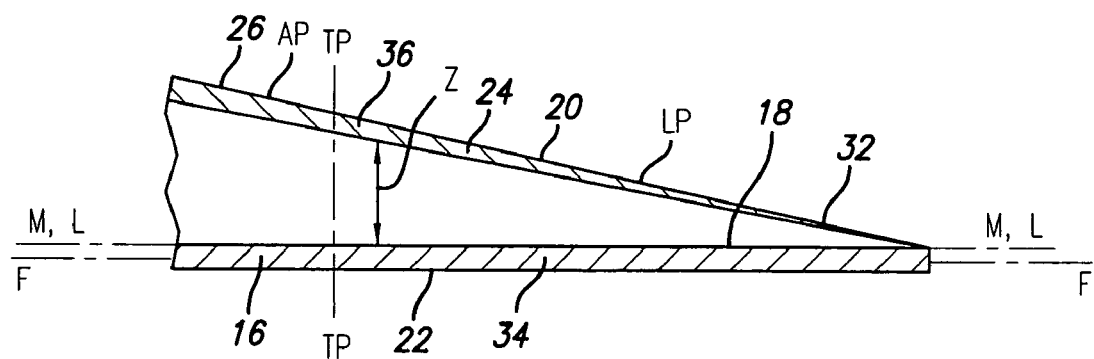
FIG. 7 is a longitudinal sectional view taken on line 7-7 in FIG. 1.

In the FIG. 1 embodiment, the general arrangement transversely is plano-convex as shown in FIGS. 5 and 6 particularly, and longitudinally is plano-convex as shown in FIG. 7. Thus in FIG. 7, the beam portion 16 comprises a first member 34 which is typically the beam portion per se and a second member 36 comprised of the deflector 24 attached to the first member. Beam portion first and second members 34, 36 are opposed to each other and are both longitudinally extended, the former is flat in its plane F-F and the latter curved in its plane C-C (FIG. 1A) to be thereby arranged in plano-convex relation in cross section (parallel to transverse plane TP) to define an airfoil profile AP insensitive to windage (in the sense that windage air flows do not cause perturbations of the suspension by contact with surface features covered by the deflector 24).

Figure 8:
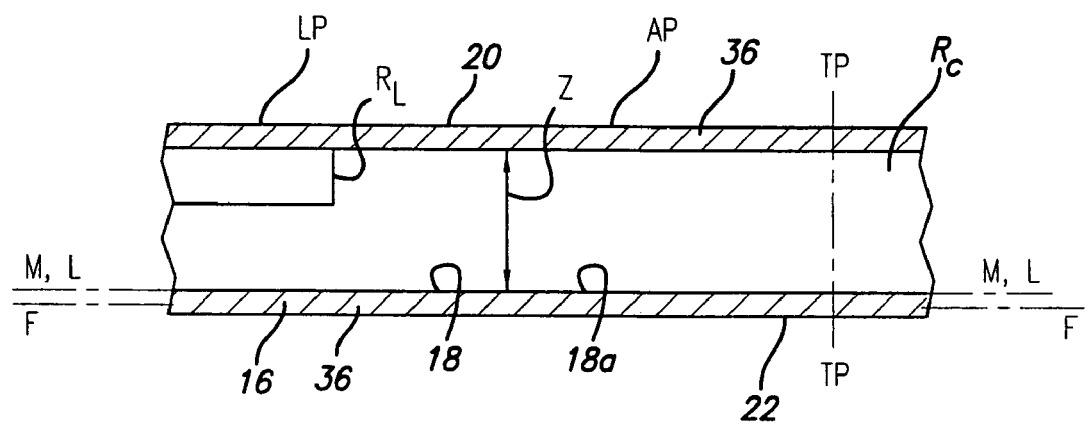
FIG. 8 is a view like FIG. 7 of an alternative embodiment.
Figure 29:
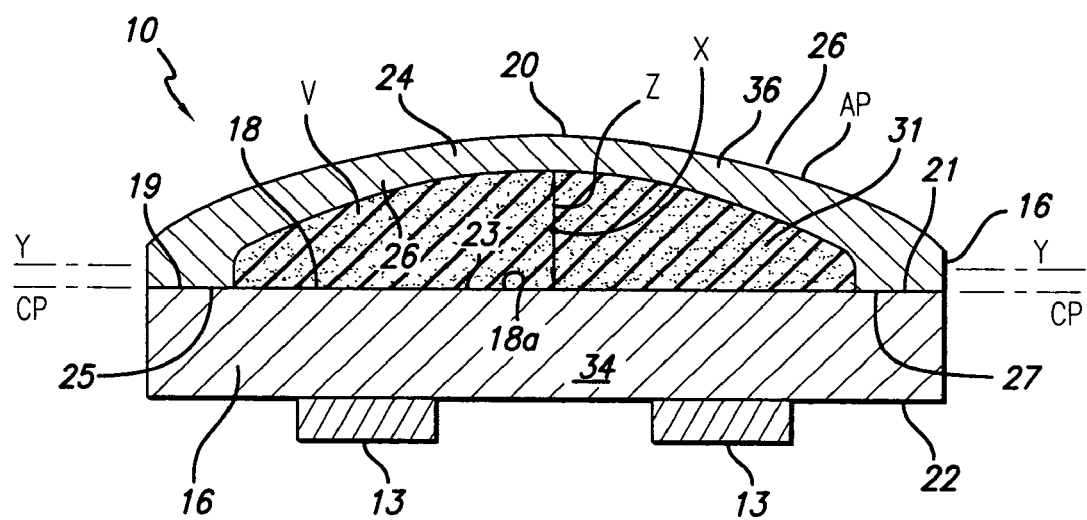
FIG. 29 is a view like FIG. 5 of a further embodiment.

In the FIG. 1 embodiment the beam portion first and second members 34, 36 are likewise arranged in a plano-convex relation in the beam portion longitudinal cross section (parallel to longitudinal plane LP), as shown in FIGS. 7, 8 and 9.

The FIG. 1 embodiment can be modified to have configurations of the first and second members (34, 36 in the FIG. 1 embodiment) other than plano-convex as shown in the following embodiments. In FIGS. 10-14 in which like numbers plus 100 indicate like parts to the embodiment of FIG. 1, the beam portion first and second members 134, 136 are arranged in parallel convex-convex relation in beam portion transverse cross-section providing a deflector 124 having a curved outer surface 126 and an airfoil profile AP as shown in FIGS. 10 and 11. The FIG. 10 embodiment can further include the structure shown in FIGS. 12 and 13 wherein first member 134 is longitudinally convex and has a curvilinear longitudinal cross section, second member 136 is also longitudinally convex and has a curvilinear longitudinal cross section, and can be tapered or not. First and second members 134 and 136 can be convex-convex in both transverse and longitudinal directions, as shown in FIG. 14.

In FIGS. 15-19 in which like numbers plus 200 indicate like parts to the embodiment of FIG. 1, the beam portion first and second members 234, 236 are arranged in convex-concave relation in beam portion transverse cross-section providing a deflector 224 having a curved outer surface 226 and an airfoil profile AP as shown in FIGS. 15 and 16, whether tapered or not. The FIG. 15 embodiment can further include the structure shown in FIGS. 17 and 18 wherein first member 234 is longitudinally convex and has a curvilinear longitudinal cross section, second member 236 is also longitudinally convex and has a curvilinear longitudinal cross section, the members being tapered or not. First and second members 234 and 236 can be convex-concave in both transverse and longitudinal directions, as shown in FIG. 19.

In a further embodiment, and with particular reference to FIGS. 1, 1A, 2, 5 and 6 the disk drive suspension 10 for use in windage conditions comprises base portion 12 fixed to actuator 11 by mount plate 12a, hinge portion 14 supported by the base portion, and beam portion 16 supported by the hinge portion and having oppositely facing upper, first and lower, second surfaces 18, 22. An electronic circuit 13a including trace conductors 13 carried in an insulator 15 is supported at the beam portion second surface 22. Beam portion upper or first surface 18 has surface features 18a, b, c inducing tracking error-causing perturbations of the beam portion from windage contact with the features. An airfoil profile-defining deflector 24 is provided in operative association with the beam portion 16 in windage-surface feature contact blocking relation.

In this and like embodiments, typically, the beam portion 16 upper or first surface 18 has a transverse extent 17 terminating in right and left edge margins 19, 21 in a common plane CP and a beam first surface central region 23 therebetween. Deflector 24 has left and right edge margins 25, 27 opposed to the first surface portion left and right edge margins 19, 21. Deflector 24 and the beam central region 23 cooperatively define a volume V extending in an x-axis X longitudinally along the first surface 18 and extending in y-axis Y transversely along the first surface. Volume V in the z-axis Z has a curved boundary between the first surface right edge and left edge in airfoil AP defining relation opposite the beam portion transverse extent 17, whereby windage encountered from the left or right by the suspension is deflected smoothly past the beam portion by the deflector airfoil.

Further, in this and like embodiments, the beam portion 16 can have a distal surface region 29 at its distal terminus 32, and the deflector 24 can taper toward the distal surface region, whereby windage encountered from the suspension left or right or the suspension distal terminus is deflected smoothly past the beam portion distal terminus by the deflector tapered airfoil AP. Beam portion second or lower surface 22 can be recessed to at least partially receive the circuit 13a in windage effect reducing relation. As shown in FIG. 20 the interior volume V can contain amounts of filler 31, e.g. plastic foam, for stiffening and other purposes.

In its method aspects the invention provides a method of manufacturing a disk drive suspension 10 having a beam portion 16 and to be operated under windage conditions, including forming an airfoil-profile deflector 24 sized to fit the beam portion, and incorporating the beam portion into the suspension with the deflector operatively associated with the beam portion, and including, typically also relatively shaping the beam portion and the deflector to have a plano-convex, convex-convex and/or concave-convex relation in their associated condition.

The invention methods further include flying a disk drive suspension 10 under windage conditions producing suspension perturbations upon windage contact with surface features 18 of the beam portion 16 of the suspension, and blocking contact of windage with the surface features with an airfoil AP shrouding the features, including, preferably defining the airfoil with a deflector 24 operatively associated with the beam portion and shaped and arranged to smoothly deflect the windage past the beam portion surface features.

The invention thus provides an improved disk drive suspension for a disk drive in which the suspension has a contour-irregularity-free deflector profile of an airfoil type that presents a smooth surface to deflect without turbulence the windage encountered by the suspension beam portion. The invention enshrouds between opposed surfaces of the suspension, be their relation plano-convex, convex-convex, concave-convex, longitudinal and/or transverse, convergently tapered or not, any beam surface features tending to cause non-resonant response of the suspension under windage conditions, defining on the suspension beam portion an airfoil that is curvilinear so as to define with the beam portion a volume having a curved major boundary and including a beam portion surface. The invention provides a suspension having a two-member monocoque configuration with the beam portion, free of edge rails, forming one member and the airfoil deflector superimposed on the beam portion the other member.

The foregoing objects are thus met.

I claim:

1. A disk drive suspension for use in windage conditions, said suspension comprising a base portion, a hinge portion supported by said base portion, and a beam portion supported by said hinge portion and having a surface, said beam portion having a longitudinal axis and extending along said axis in a flat plane to a distal terminus and continuously progressively tapering inward toward said terminus within said plane, said beam portion surface having surface features inducing tracking error-causing perturbations of said beam portion from windage contact with said features, and an airfoil profile-defining deflector in operative association with said beam portion in windage-surface feature contact blocking relation.

2. The disk drive suspension according to claim 1, in which said deflector extends in a curved plane about a deflector longitudinal axis parallel with said beam portion longitudinal axis.

3. The disk drive suspension according to claim 2, in which said deflector has an airfoil profile that is continuously progressively tapered inward along said deflector axis within said curved plane.

4. The disk drive suspension according to claim 2, in which said deflector has a constant airfoil profile for the majority of its extent along said deflector longitudinal axis within said curved plane.

5. The disk drive suspension according to claim 1, wherein said deflector comprises longitudinally extended and opposed first and second members arranged in plano-convex relation in said beam portion transverse cross-section to define said airfoil profile.

6. The disk drive suspension according to claim 5, in which said beam portion is free of edge rails.

7. The disk drive suspension according to claim 5, in which said first and second members are also arranged in plano-convex relation in said beam portion longitudinal cross section.

8. The disk drive suspension according to claim 5, in which said first and second members are arranged in concave-convex relation in beam portion longitudinal cross section.

9. The disk drive suspension according to claim 5, in which said first and second members are arranged in convex-convex relation in beam portion longitudinal cross section.

10. A disk drive suspension for use in windage conditions, said suspension comprising a base portion, a hinge portion supported by said base portion, and a beam portion supported by said hinge portion and having a surface, said beam portion surface extending in a flat plane and progressively tapering within said plane, said beam portion surface having surface features inducing tracking error-causing perturbations of said beam portion from windage contact with said features, and an airfoil profile-defining deflector in operative association with said beam portion in windage-surface feature contact blocking relation.

11. The disk drive suspension according to claim 10, in which said deflector is attached to said beam portion surface and generally congruent with said beam portion surface where attached.

12. The disk drive suspension according to claim 11, in which said deflector transverse profile is arcuate.

13. The disk drive suspension according to claim 12, in which said deflector longitudinal profile is a conical section.

14. A disk drive suspension for use in windage conditions, said suspension comprising a base portion, a hinge portion supported by said base portion, and a beam portion supported by said hinge portion and having oppositely facing first and second surfaces, a circuit supported by said beam portion second surface, said beam portion first surface having surface features inducing tracking error-causing perturbations of said beam portion from windage contact with said features, and an airfoil profile-defining deflector in operative association with said beam portion in windage-surface feature contact blocking relation.

15. The disk drive suspension according to claim 14, in which said beam portion first surface has a transverse extent terminating in right and left edge margins in a common plane and a beam first surface central region therebetween, and said deflector has left and right edge margins opposed to said first surface portion left and right edge margins, said deflector and said beam central region cooperatively defining a volume extending in an x-axis longitudinally along said first surface and extending in a y-axis transversely along said first surface and in the z-axis a curved boundary between said first surface left edge and said right edge in airfoil defining relation opposite said beam portion transverse extent, whereby windage encountered from the left or right by said suspension is deflected smoothly past said beam portion by the deflector airfoil.

16. The disk drive suspension according to claim 14, in which said beam portion has a distal surface region at its distal terminus, and said deflector tapers toward said distal surface region, whereby windage encountered from the suspension left or right or the suspension terminus is deflected smoothly past said beam portion distal terminus by said deflector tapered airfoil.

17. The disk drive suspension according to claim 16, in which said beam portion first surface has a distal surface region at its distal terminus, and said deflector comprises a conical section tapered inward so that its left and right edge margins converge and taper downward toward said first surface distal surface region, whereby windage encountered by said beam portion is deflected smoothly past said beam portion distal terminus by said deflector tapered airfoil.

18. The disk drive suspension according to claim 17, in which said beam portion is free of edge rails.

19. The disk drive suspension according to claim 14, in which said beam portion second surface is recessed to at least partially receive said circuit in windage effect reducing relation.

20. A method of manufacturing a disk drive suspension to be operated under windage conditions, including:
   forming said suspension comprising a base portion, a hinge portion supported by said base portion, and a beam portion supported by said hinge portion and having oppositely facing first and second surfaces;
   providing a circuit supported by said beam portion second surface, said beam portion first surface having surface features inducing tracking error-causing perturbations of said beam portion from windage contact with said features;
   providing an airfoil profile-defining deflector in operative association with said beam portion in windage-surface feature contact blocking relation;
   forming an airfoil-profile deflector sized to fit said beam portion; and
   incorporating said beam portion into a suspension with said deflector operatively associated with said beam portion.

21. The method according to claim 20, including also relatively shaping said beam portion and said deflector to have a plano-convex, convex-convex and/or concave-convex relation in their associated condition.

* * * * *